(12) United States Patent
Dinh

(10) Patent No.: US 7,576,284 B2
(45) Date of Patent: Aug. 18, 2009

(54) GANGABLE ELECTRICAL BRACKET

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/165,691

(22) Filed: Jul. 1, 2008

(65) Prior Publication Data

US 2009/0038844 A1    Feb. 12, 2009

Related U.S. Application Data

(60) Provisional application No. 60/964,262, filed on Aug. 10, 2007.

(51) Int. Cl.
  *H01J 5/00* (2006.01)
(52) U.S. Cl. .............................. 174/50; 174/53; 174/58; 361/641; 439/535; 248/906
(58) Field of Classification Search .................... 174/53, 174/50, 58, 17 R; 220/3.62, 3.64, 4.02; 361/641; 439/535; 248/906
See application file for complete search history.

(56) References Cited

U.S. PATENT DOCUMENTS

| | | | |
|---|---|---|---|
| 1,456,385 A | 5/1923 | Kvarnstrom | |
| 1,483,453 A | 2/1924 | Knoderer | |
| 1,531,309 A | 3/1925 | Ryden | |
| 6,057,509 A * | 5/2000 | Simmons | 174/53 |
| 6,229,087 B1 * | 5/2001 | Archer | 174/50 |
| D459,312 S | 6/2002 | Roesch et al. | |
| 6,422,781 B1 | 7/2002 | Ofcharsky et al. | |
| 6,508,445 B1 | 1/2003 | Rohmer | |
| 6,710,245 B2 | 3/2004 | Roesch et al. | |
| 6,727,428 B2 | 4/2004 | Archer et al. | |
| 6,872,884 B2 | 3/2005 | Roesch et al. | |
| 6,903,272 B2 | 6/2005 | Dinh | |
| 7,351,910 B1 | 4/2008 | Magisano et al. | |

* cited by examiner

*Primary Examiner*—Dhiru R Patel
(74) *Attorney, Agent, or Firm*—Hoffmann & Baron, LLP

(57) ABSTRACT

A ganged electrical device which supports electrical components. The ganged electrical device includes a housing having first and second opposed elongate side walls and a pair of end walls joining the side walls. The first and second side walls include cooperative attachment structure for attaching the first side wall of one housing to a second side wall of another identical housing to place the respective first and second side walls in side-by-side engagement.

12 Claims, 3 Drawing Sheets

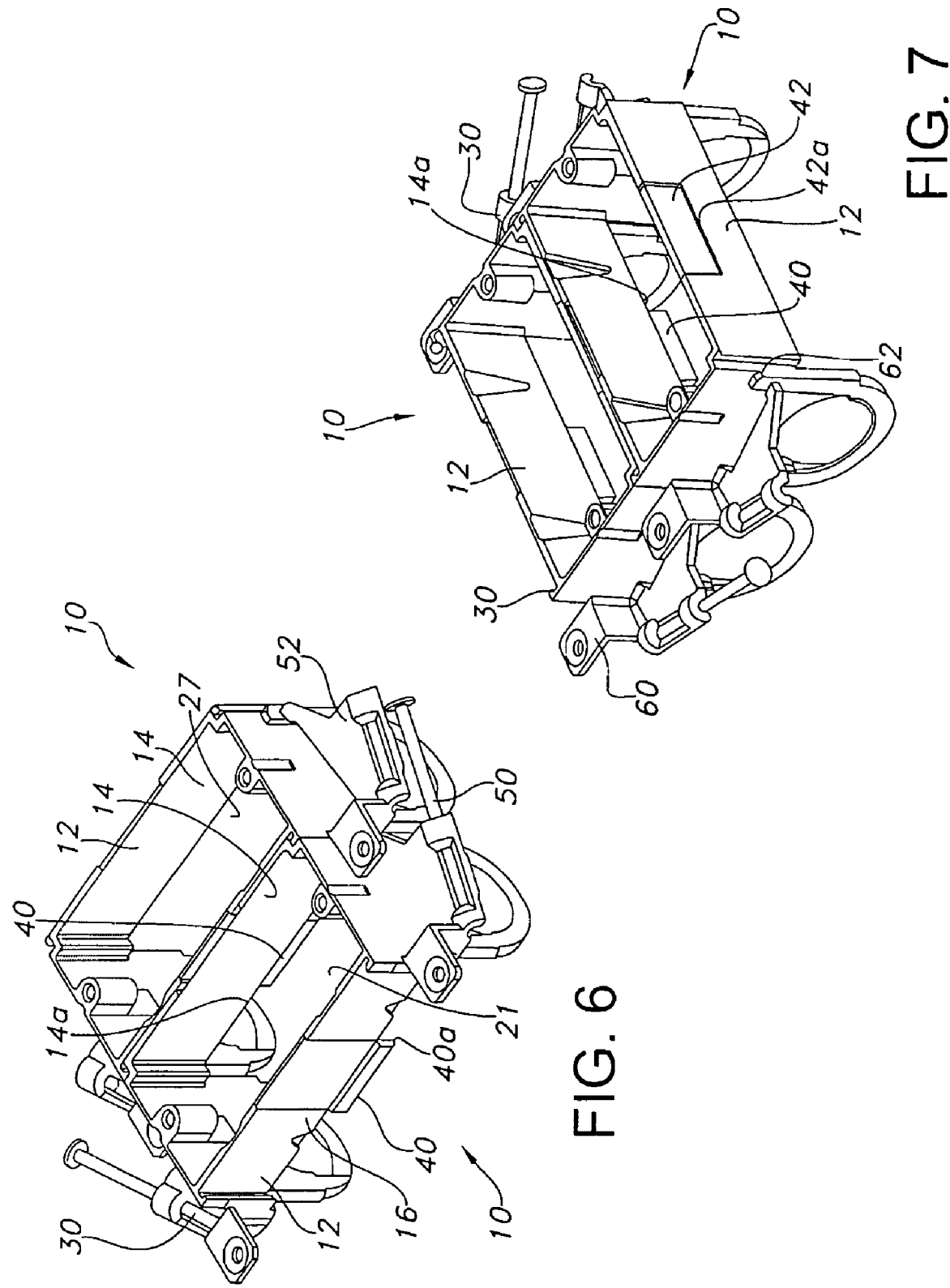

GANGABLE ELECTRICAL BRACKET

CROSS-REFERENCE TO RELATED APPLICATION

This application claims priority to U.S. Provisional Patent Application No. 60/964,262, filed on Aug. 10, 2007, herein incorporated by reference.

FIELD OF THE INVENTION

This invention relates to a gangable device for supporting an electrical component. More particularly, it relates to a plurality of identical low voltage gangable brackets capable of being coupled together.

BACKGROUND OF THE INVENTION

Electrical boxes and brackets come in various sizes to accommodate varying numbers and sizes of electrical components, such as electrical outlets, switches, etc. Typically, this requires a manufacturer, distributor, retailer and the like to manufacture and inventory multiple different boxes and brackets for different purposes.

Two main types of electrical wall boxes and brackets exist. One type is the "existing work" version in which a new electrical box is installed in existing construction, and the other manner is the "new work" construction in which a suitably sized electrical box is added to a structure in the process of being built.

When an existing electrical box in existing construction must be expanded to hold, for example, additional electrical switches, typically one must remove a large portion of the wall surrounding the existing electrical box. This greatly disfigures the area around the electrical box. After removing the existing electrical box, a differently-shaped, larger sized box is installed and wired after which the wall is refinished and repainted. This is a very labor-intensive and time-consuming task.

In "new work" construction where an electrical box is installed in a structure being built, an electrical box is typically connected to a support stud of the structure by means of a nail or screw attachment that is incorporated in the electrical box design. Drywall having holes cut for access to the electrical box is then installed to the support studs. Typically, in new construction, contractors must have on hand a number of differently sized electrical boxes to be able to select the required size as needed. Likewise, manufacturers, distributors and retailers must be able to supply all of the sizes which may be required in any particular construction project.

Accordingly, it is desirable to have a single electrical box and bracket configuration that is easily gangable with an identical electrical box and bracket and useful in both existing and new work construction.

SUMMARY OF THE INVENTION

The present invention provides a gangable device for supporting an electrical component. The gangable device includes a housing having a first elongate side wall and an opposed second elongate side wall and a pair of end walls joining the first and second side walls which define a housing perimeter for supporting an electrical component therein. The first and second side walls include cooperative attachment structure for attaching the first side wall of one of the housings to the second side wall of an identical housing to place the respective first and second side walls in side-by-side engagement.

In a preferred embodiment of the present invention, the cooperative attachment structure includes cooperative tongue-in-groove structure for slidably attaching the first side wall of one of the housings to the second side wall of the other housing.

In addition, the cooperative attachment structure may further include the first side wall having a resilient hook depending therefrom for latching engagement with the second side wall of the other housing.

The present invention further provides a ganged electrical device. The ganged device includes first and second identical brackets, each bracket having a first and second opposed side walls and opposed end walls. The first bracket is attached to the second bracket with the second side wall of the first bracket being attached to the first side wall of the second bracket. The first side wall includes one of either a tongue and groove, while the second side wall includes the other of a tongue and groove for permitting such attachment. The ganged device further includes a resilient hook and recess on respective first and second side walls for mutual engagement upon attachment of the first side wall of the second bracket to the second side wall of the first bracket.

BRIEF DESCRIPTION OF THE DRAWINGS

FIGS. 6 and 7 show a pair of gangable brackets in the ganged condition.

DETAILED DESCRIPTION OF THE PREFERRED EMBODIMENT

Figure 1:
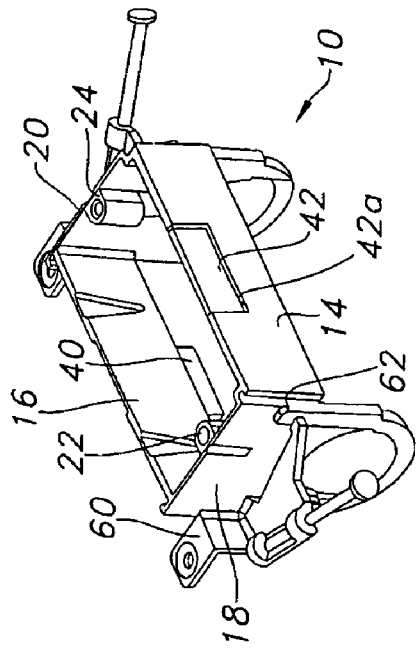
FIGS. 1-4 are perspective views of the gangable bracket of the present invention.
Figure 2:
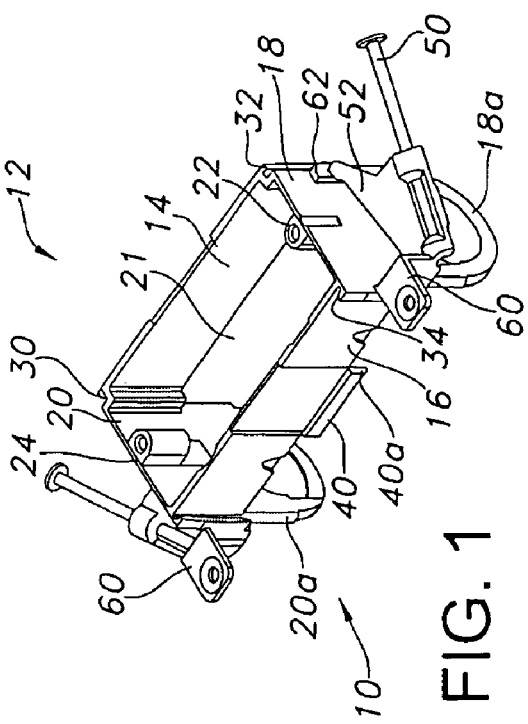
Figure 3:
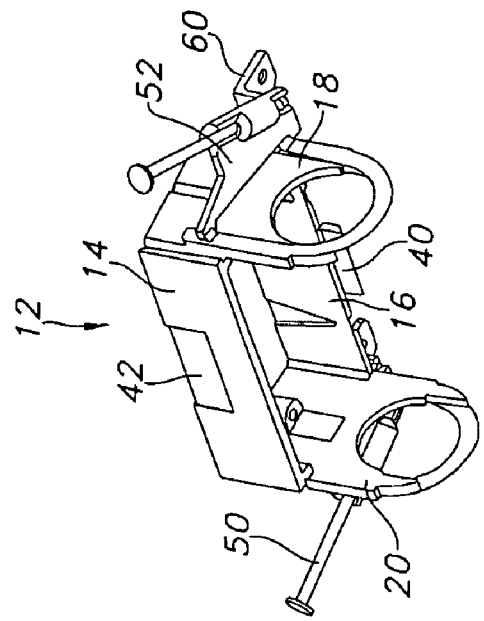
Figure 4:
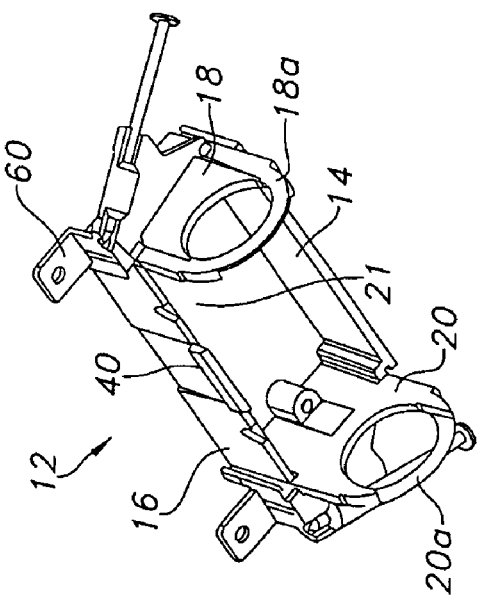

The present invention provides a gangable device 10 for supporting electrical components. In the present illustrative embodiment, a gangable electrical bracket 12 is used to accommodate low voltage electrical components such as communication fixtures. However, the device of the present invention may be used as an electrical box used to support components such as electrical switches and receptacles.

The present invention provides the ability to couple or gang together two or more identically formed devices so as to accommodate a plurality of such electrical components.

Referring to FIGS. 1-4 of the present invention, a gangable bracket 12 is shown. Gangable bracket 12 is a frame-shaped member preferably formed of a suitable plastic. Bracket 12 includes an elongate first side wall 14 and an opposed generally parallel second side wall 16. Side walls 14 and 16 are joined by end walls 18 and 20 to define a generally rectangular perimetrical housing 10. The interior 21 defined by the side walls supports a low voltage electrical component (not shown). Such a component may be mounted to conventional centrally located screw apertures 22 and 24 supported by the end walls. The bracket also includes support rings 18a and 20a extending from end walls 18 and 20 for supporting electrical wire, conduit or tubing extending from the bracket 12.

Figure 5:
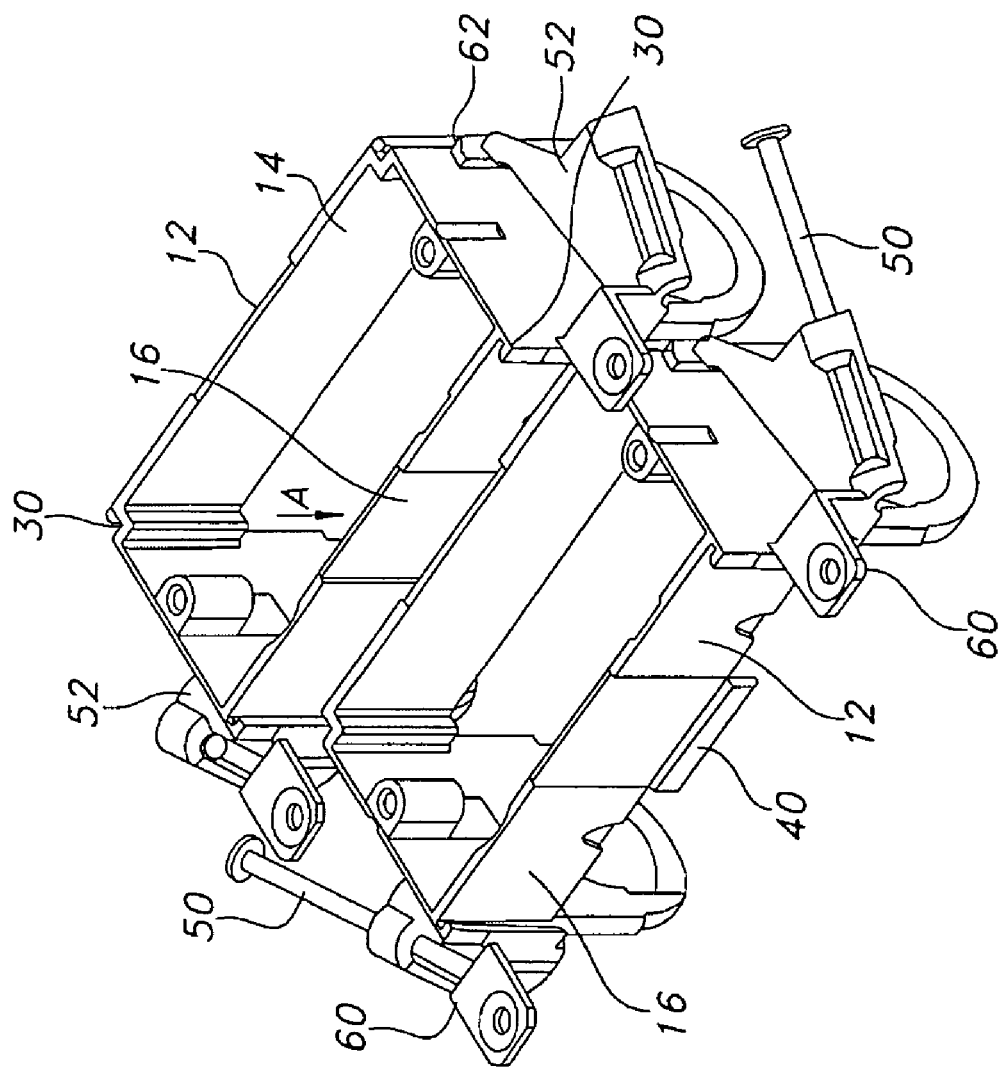
FIG. 5 is a perspective showing of two gangable brackets shown in FIGS. 1-4 being slidably attached.

As particularly shown in FIGS. 5-7, a pair of identically formed brackets 12 are designed for gangable side-by-side attachment. The first side wall of 14 of one of the gangable brackets 12 is designed for placement against the second side wall 16 of the other gangable bracket 12. In this regard, the side walls of gangable bracket 12 include cooperative attachment structure which allow for the sliding attachment of one gangable bracket 12 to the other gangable bracket 12. The cooperative attachment structure may preferably include interconnected tongue-in-groove elements 30 located at the ends of the side walls 14, 16 adjacent end walls 18 and 20. Each tongue-in-groove structure 30 defines an extending tongue 32 which is insertable into a mating groove 34 adjacent the tongue. When the side wall 14 of one bracket 12 is aligned for sliding engagement with the side wall 16 of another bracket 12, the tongue 32 of one tongue-in-groove structure 30 is slidably insertable into the groove 34 of the aligned tongue-in-groove structure 30. In the present illustrative embodiment, first side wall 14 defines the tongue 32 which extends adjacent end walls 18 and 20, while second side wall 16 defines groove 34 adjacent end walls 18 and 20.

As is depicted in FIG. 5, one gangable box 12 may be slidably attached to another gangable box 12, by sliding movement in the direction of arrow A. The interconnection of the tongue-in-groove structure 30 of the respective side walls 14 and 16 facilitates such sliding movement. Slidable engagement between the adjacent gangable boxes 12 places the first side wall 14 of one box 12 in side-by-side engagement with the second side wall 16 of the other box 12. Thus, a double wall thickness is provided between the interiors 21 of the respective brackets 12.

In order to provide for secure engagement between the ganged boxes 12, the cooperative attachment structure of the present invention may additionally include a dependent resilient hook 40 formed at a central location of side wall 16. Hook 40 is designed to slide along side wall 14 of the attached gangable box 12 upon sliding engagement of the side walls. The extending hook 40 is initially accommodated in a partial recess 42 in side wall 14. This facilitates initial insertion and slidable movement of the hook 40. The hook 40 slides along the partial recess 42 whereupon the distal tapered surface 40a thereof engages the transverse wall 42a of the recess 42. Continued sliding movement of the respective brackets 12 resiliently deflects hook 40 over wall 42a so that it rides along the remainder of the side wall 14.

As shown in FIGS. 5 and 7, once the hook 40 reaches the edge 14a of side wall 14, it snaps over the edge latching the one gangable bracket 12 to the adjacent side wall 14 of the other bracket 12. While the cooperative tongue-in-groove structure 30 on side walls 14 and 16 provide for the slidable movement of the respective brackets 12, the hook 40 latches the brackets 12 together preventing inadvertent detachment of the attached bracket by preventing sliding movement of the bracket in a direction opposite arrow A. In addition, further slidable movement of bracket 12 in the direction of arrow A is prevented by the engagement of screw tabs 60 (defined further below) with a stop element 62 formed on end walls 18 and 20. As is shown in FIGS. 6 and 7, the assembled ganged brackets 12 present a flush front face which facilitates accommodating the wall board.

Bracket 12 may be attached to a wall stud employing fasteners such as nails 50 which are supported in an angular fashion by fastener supports 52. In the alternative, bracket 12 can be supported to a stud by using recessed screw tabs 60 which support mounting screws (not shown). The screw tabs 60 are recessed to accommodate the thickness of wall board placed thereover.

It is contemplated that the gangable bracket 12 may be supported to the stud either as a single unit or in multiple ganged units. Also, a single bracket can be attached to the stud and a second bracket may be subsequently attached to the first bracket. As shown in FIGS. 5-7, when multiple brackets are employed, the nails 50 of the attached bracket are preferably removed.

While the invention has been described in relationship to the preferred embodiments, it will be understood by those skilled in the art that various changes may be made without deviating from the fundamental nature and scope of the invention as defined in the appended claims.

What is claimed is:

1. A gangable electrical device for supporting an electrical component comprising:
 a pair of integrally formed frame-shaped brackets, each of said brackets having first and second opposed side walls joined by a pair of opposed end walls defining a bracket perimeter for enclosing said electrical component; each of said first and second side walls having cooperative attachment structure thereon, such that said pair of brackets can be joined together by attaching said first side wall of one of said brackets of said pair to said second side wall of the other said bracket of said pair; wherein said cooperative attachment structure includes a resilient hook on said first side wall of each of said brackets and a hook engaging recessed portion on said second side wall of each of said brackets, said hook of said first side wall of one of said brackets being engageable with said hook engaging recessed portion of said second side wall of the other of said brackets.

2. A gangable electrical device of claim 1 wherein said first and second side walls include cooperative tongue-in-groove structure for slidably attaching said first side wall of said one bracket to said second side wall of said other bracket.

3. A gangable electrical device of claim 2 wherein said cooperative tongue-in-groove structure is located adjacent said end walls.

4. A gangable electrical device of claim 1 wherein said bracket includes means for attaching said bracket to a structural stud.

5. A gangable electrical device of claim 4 wherein said attaching means includes a screw tab extending from one said end wall, said screw tab accommodating a mounting screw.

6. A gangable electrical device of claim 5 wherein one said end wall includes a screw tab engagement stop.

7. A gangable electrical device of claim 4 wherein said attachment means further includes an integrally formed fastener support for supporting a fastener.

8. A gangable electrical device of claim 1 wherein one said end wall supports an extending ring for supporting wire or conduit extending from said bracket.

9. A gangable electrical device comprising:
 first and second identical electrical brackets, each of said brackets having first and second opposed side walls and opposed end walls; said first side wall of each said brackets having a one of a tongue and groove and said second side wall of each of said brackets having the other of a tongue and groove for attaching said first side wall of said first bracket with said second side wall of said second bracket; and wherein said first side wall of each of said brackets includes a resilient hook and said second side wall of each of said brackets includes a recess, said hook of said first side wall of said first bracket being engageable with said recess of said second side wall of said second bracket.

10. A gangable electrical device of claim 9 wherein each said bracket includes means for attaching said bracket to a structural stud.

11. A gangable electrical device of claim 10 wherein said attaching means includes a fastener support on said end wall.

12. A gangable electrical device of claim 10 wherein said attaching means includes a screw tab extending from each end wall, each said screw tab accommodating a mounting screw.

* * * * *